Sept. 29, 1964 A. J. TAYLOR 3,151,030
NUCLEAR POWER PLANT HEAT EXCHANGER CONTROL
Filed Nov. 12, 1958 5 Sheets-Sheet 1
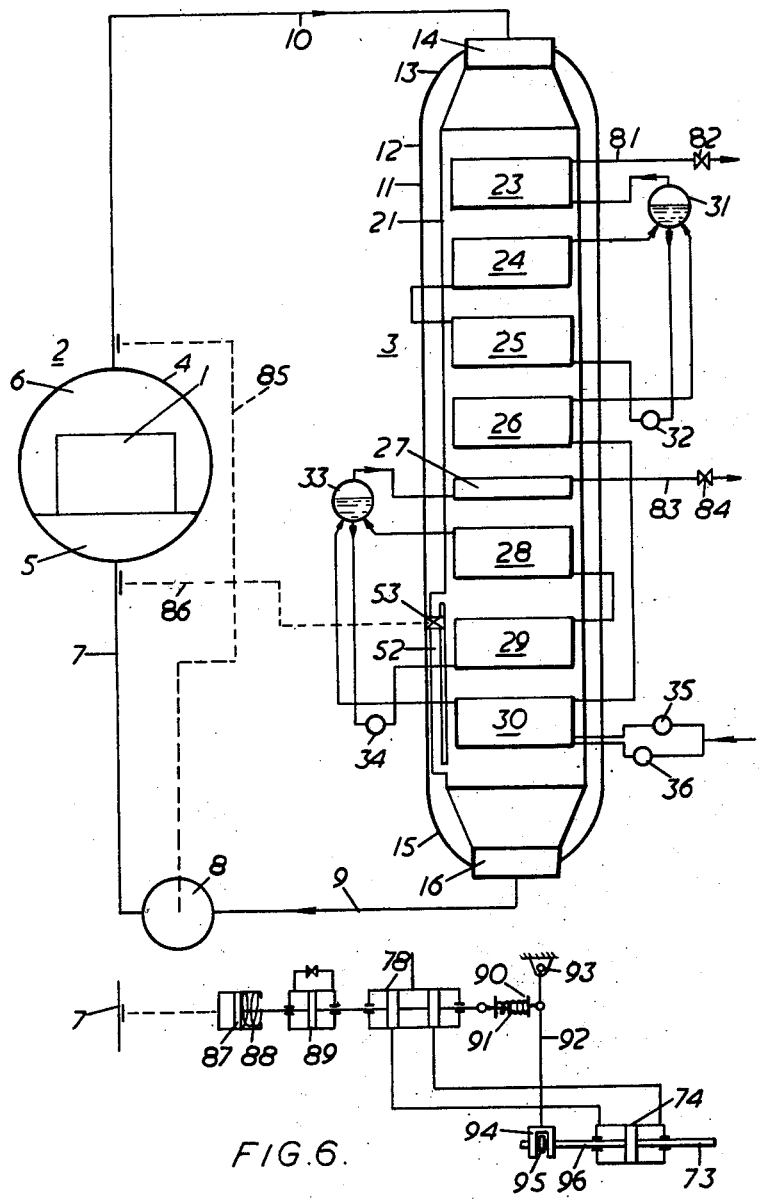
*Inventor*
Anthony J. Taylor
*Attorney*

Sept. 29, 1964         A. J. TAYLOR         3,151,030
NUCLEAR POWER PLANT HEAT EXCHANGER CONTROL
Filed Nov. 12, 1958                5 Sheets-Sheet 2
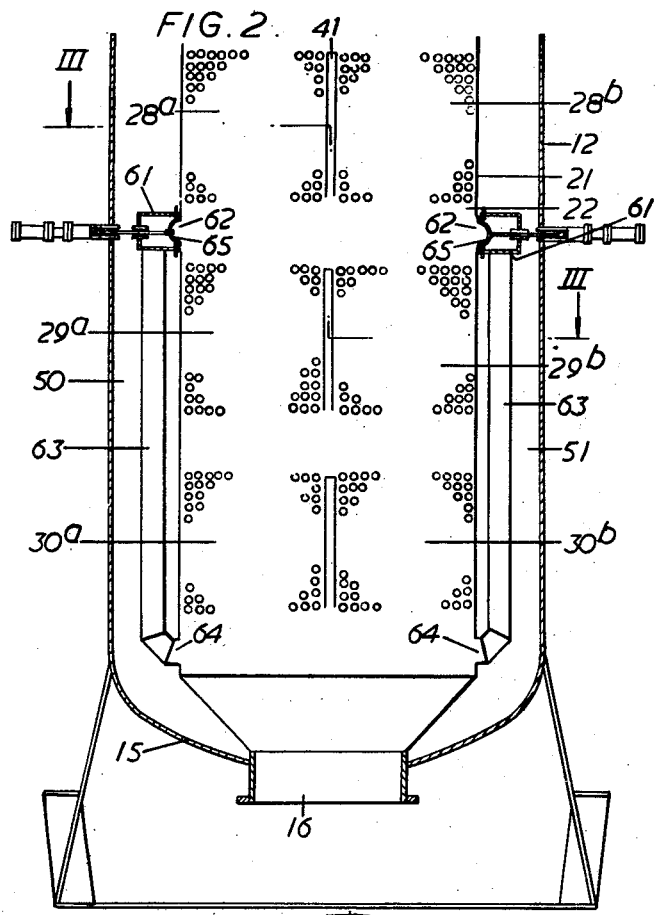
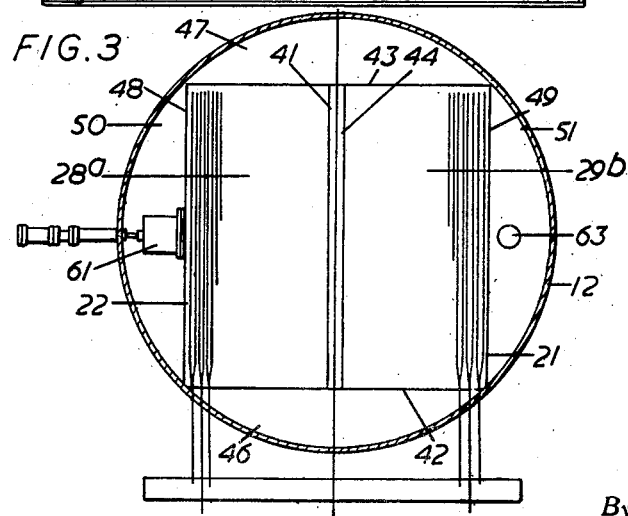
Inventor
Anthony J. Taylor
By *[signature]*
Attorney

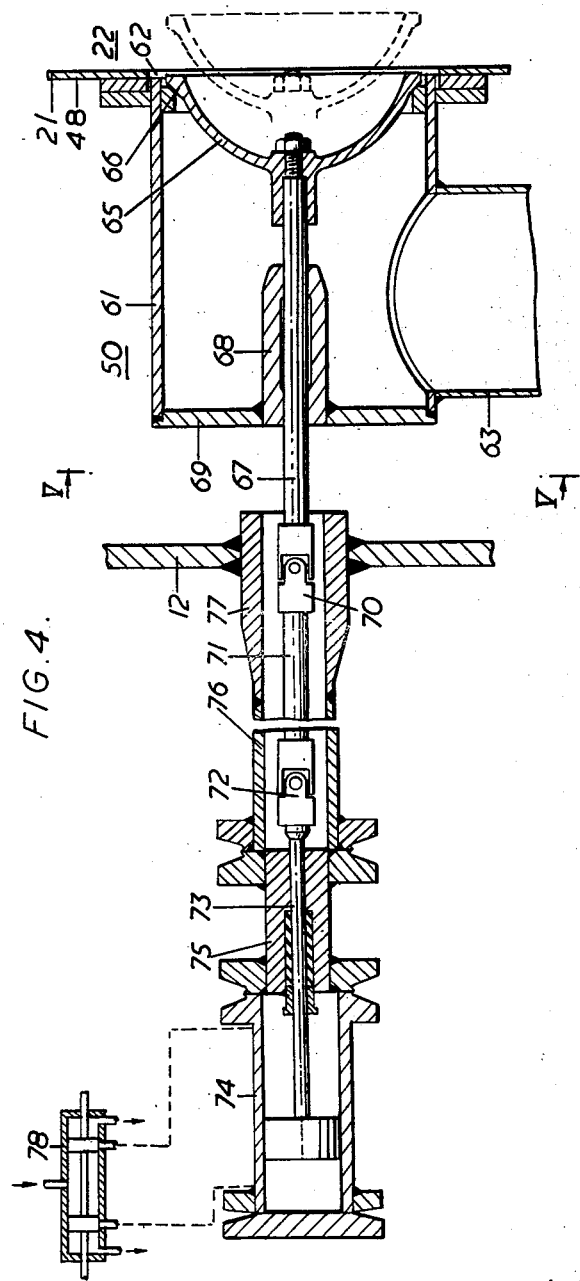

Sept. 29, 1964　　　A. J. TAYLOR　　　3,151,030
NUCLEAR POWER PLANT HEAT EXCHANGER CONTROL
Filed Nov. 12, 1958　　　　　　　　　　5 Sheets-Sheet 4

Inventor
Anthony J. Taylor
By
Attorney

Sept. 29, 1964  A. J. TAYLOR  3,151,030
NUCLEAR POWER PLANT HEAT EXCHANGER CONTROL
Filed Nov. 12, 1958  5 Sheets-Sheet 5
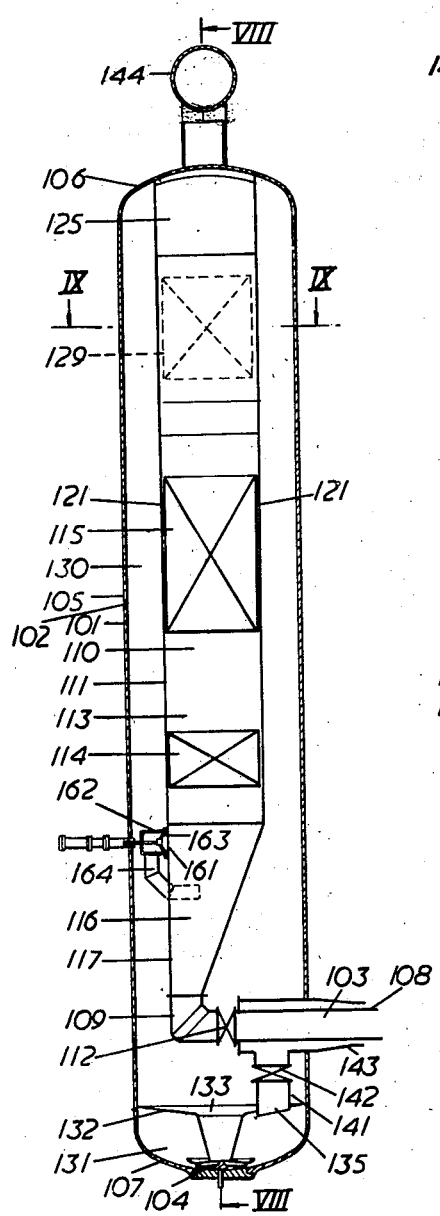
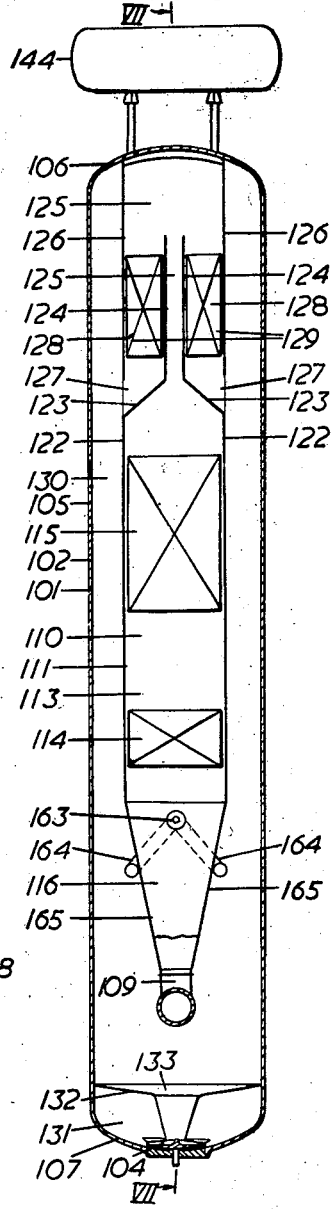
Inventor
Anthony J. Taylor
By *J.P. Moran*
Attorney United States Patent Office 3,151,030
Patented Sept. 29, 1964

3,151,030
NUCLEAR POWER PLANT HEAT
EXCHANGER CONTROL
Anthony J. Taylor, London, England, assignor to Babcock & Wilcox Limited, London, England, a British company
Filed Nov. 12, 1958, Ser. No. 773,430
Claims priority, application Great Britain Nov. 12, 1957
6 Claims. (Cl. 176—20)

This invention relates to heat generating and utilising plant of the kind having a gas cooled nuclear reactor and coolant circulating means for circulating coolant under super-atmospheric pressure through the reactor and through a pressure vessel containing heat exchange means.

In such plant the maintenance during operation of a substantially constant coolant temperature at the coolant inlet to the nuclear reactor is desirable. The plant may be designed to operate at a given power level with a given rate of coolant circulation so that given desired coolant temperatures tend to prevail at different points in the system, but in practice such temperatures may fluctuate even under design conditions of operation. If a change is made to a power level of operation different from the design power level the coolant inlet temperature to the reactor may be expected in general to vary; temporary disturbances arising in the change from one power level to another may, moreover, cause rather wide fluctuations in the coolant reactor inlet temperature, as when the heat exchanger is in the form of a steam generator in which the change from one power level to another may, owing to sluggishness in the automatic feed flow regulation, be accompanied by variations in coolant temperature after the steam generator which may be difficult to counter.

An object of the invention is the provision of advantageous means whereby coolant temperature variations at the inlet to a nuclear reactor may be reduced.

Heat generating and utilising plant in accordance with the invention includes a gas-cooled nuclear reactor, coolant circulating means for circulating coolant under superatmospheric pressure through the reactor and through a pressure vessel containing heat exchange means and regulating means for regulating the coolant temperature at the inlet to the reactor including by-pass means within the pressure vessel for by-passing coolant in relation to at least a part of the heat exchange means and valve means for controlling the flow of coolant through the by-pass means.

The invention will now be described by way of example with reference to the accompanying drawings in which:

FIGURE 1 shows schematically the paths of gas coolant flow in a closed circuit including a gas cooled nuclear reactor and a heat exchanger tower;

FIGURE 2 is an elevation showing the lower part of the heat exchanger tower, in section on the axis thereof;

FIGURE 3 is a plan view of the tower in section on line III—III of FIGURE 2;

Figure 5:
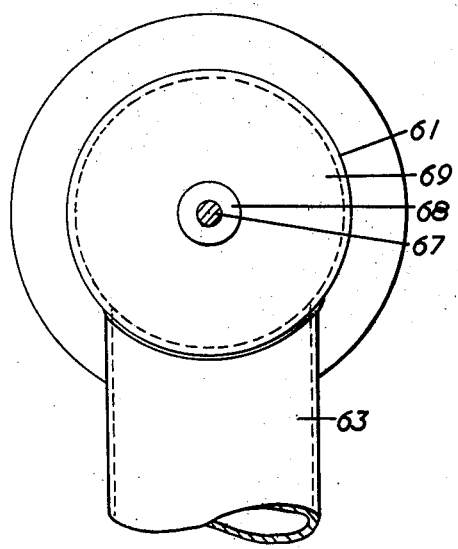
Figure 9:
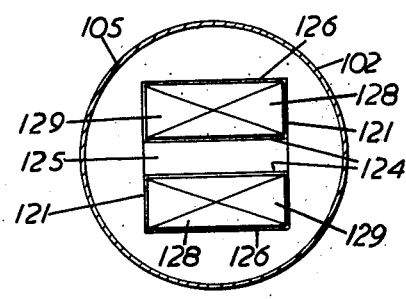

FIGURE 4 comprises a more detailed sectional view of gas by-pass valve means;

FIGURE 5 is an elevation, seen from the line V—V of of FIGURE 4, of said valve means;

FIGURE 6 illustrates a scheme for the operation of gas by-pass valve means in dependence upon a control signal;

FIGURE 7 is an elevation of a modified heat exchanger tower, in section on the line VII—VII of FIGURE 8;

FIGURE 8 is an elevation of the modified heat exchanger tower in section on the line VIII—VIII of FIGURE 7 and FIGURE 9 is a plan view of the modified heat exchanger tower in section on the line IX—IX of FIGURE 7.

Referring to FIGURES 1 to 6 of the drawings, heat generated in the core 1 of a graphite-moderated natural uranium reactor 2 is transferred by carbon dioxide gas coolant circulated in a closed circuit to steam generating and superheating means associated with a heat exchanger tower 3.

The reactor core 1 comprises a graphite block assembly of cylindrical form supported with its axis vertical within a spherical pressure vessel 4 and pierced by a multiplicity of vertical channels which house canned uranium fuel elements and which provide passages for the flow past the fuel elements of carbon dioxide gas coolant to remove the heat generated in the fuel elements. Partitions within the pressure vessel 4 define a gas coolant inlet space 5 in the lower part of the pressure vessel in communication with the lower ends of the core channels and a gas coolant outlet space 6 in the upper part of the pressure vessel in communication with the upper ends of the core channels.

The gas coolant is supplied through a conduit 7 to the inlet space 5 by a compressor 8 which withdraws gas coolant through a conduit 9 from the lower end of the heat exchanger tower 3; the gas coolant driven through the core channels flows from the outlet space 6 through a conduit 10 to the upper end of the heat exchanger tower 3.

The heat exchanger tower 3 comprises a pressure shell 11 consisting of a cylindrical wall 12, an upper dished end 13 formed with a gas coolant inlet 14 to which the conduit 10 leads and with a lower dished end 15 formed with a gas coolant outlet 16 from which the conduit 9 leads, a casing 21 to define within the pressure shell a vertical gas coolant passage 22 of square cross-section and eight heat exchange units 23 to 30 in successive heat exchange relation with the gas coolant flowing downwardly in the passage 22. The heat exchange units 23 to 26 and 30 provide the heat exchange elements of a boiler adapted to operate at a relatively higher pressure and the heat exchange units 27 to 29 and 30 provide the heat exchange elements of a boiler adapted to operate at a relatively lower pressure.

The high pressure boiler includes a steam and water drum 31, arranged outside the tower, which is connected to pass water from its water space to the inlet of a high pressure circulating pump 32 the outlet of which is connected to the heat exchange unit 25, and to receive a steam and water mixture from the heat exchange unit 24 connected in series with the heat exchange unit 25. The steam outlet from the drum 31 is connected to the heat exchange unit 23 in which steam is superheated. The low pressure boiler includes a steam and water drum 33 arranged outside the tower, which is connected to pass water from its water space to the inlet of a low pressure circulating pump 34 the outlet of which is connected to the heat exchange unit 29, and to receive a steam and water mixture from the heat exchange unit 28 connected in series with the heat exchange unit 29. The steam outlet from the drum 33 is connected to the heat exchange unit 27 in which steam is superheated.

Each of the heat exchange units 23 to 30 consists of a bank of tubes extending in a plurality of loops backwards and forwards across the gas passage 22. The heat exchange unit 30 is adapted to provide both a primary economiser for the high pressure boiler and an economiser for the low pressure boiler. To this end some of the tubes thereof are arranged to receive water from a feed pump 35 and to pass water to the heat exchange unit 26 which discharges into the drum 31 and is adapted to provide a secondary economiser for the high pressure boiler and some of the tubes of the heat exchange unit 30 are arranged to receive water from a feed pump 36 and to pass water to the drum 33.

The tube bank of each of the heat exchange units consists of two tube bank sections side by side separated by a narrow vertical space bounded laterally by partitions and normally closed, in order to prevent the passage of gas therethrough, by a plate at the upper end of the space. Thus, referring to FIGURES 2 and 3 the heat exchange unit 28 consists of two tube bank sections 28a and 28b separated by a narrow vertical space 41 extending from the wall 42 of the gas passage 22 to the opposite wall 43 thereof, the heat exchange unit 29 of two tube bank sections 29a and 29b separated by a narrow vertical space 44 also extending from the wall 42 to the wall 43 and the heat exchange unit 30 of two tube banks 30a and 30b separated by a narrow vertical space 45 also extending from the wall 42 to the wall 43 of the passage. Between the wall 42 and the adjacent part of the cylindrical wall 12 is a segmental space 46, between the wall 43 and the adjacent part of the cylindrical wall is a segmental space 47, and between the remaining walls 48 and 49 of the gas vessel and the respective adjacent parts of the cylindrical wall 12 are respective segmental spaces 50 and 51.

Indicated schematically in FIGURE 1 are by-pass means 52 provided with valve means 53 for bypassing gas coolant in relation to the heat exchange units 29 and 30. Referring to FIGURES 2 to 5, such valve means comprise in each of the segmental spaces 50 and 51 a cylindrical box 61 attached to the wall of the casing 21 at a circular aperture 62 formed in said wall at a location on the centre line of said wall below the heat exchange unit 28 and above the heat exchange unit 29, a conduit 63 connecting the interior of the box 61 with an aperture 64 formed in the wall of the casing 21 at a location on the centre line of said wall below the heat exchange unit 30, and a mushroom valve for controlling the entry of gas from the gas coolant passage 22 to the box 61. The mushroom valve includes a cup-shaped valve member 65 adapted when the valve is in the closed position to engage a valve seat 66 secured to the inner wall of the box 61, and arranged for movement in the direction inwardly towards the axis of the heat exchange tower to open the valve. The valve spindle 67 for operating the valve member extends through a close fitting guide 68 secured to the outer wall 69 of the box 61 and is connected through a universal joint 70, an intermediate shaft 71, and a second universal joint 72 to the piston shaft 73 of a piston and cylinder arrangement 74 by which the valve is hydraulically operated.

The piston shaft 73 extends through a gland piece 75, which is mounted on the end of a tubular piece 76 itself mounted on the end of a sleeve 77 which is welded to the cylindrical wall 12; the tubular piece 76 and the sleeve 77 accommodate the universal joints 70 and 72 with clearance. Hydraulic pressure may be applied selectively to one side or the other side of the piston by operating a balanced control valve 78 controlling the application of pressure liquid to the cylinder and the exhaust of liquid from the cylinder.

The steam generated and superheated in the high pressure boiler is automatically maintained at a constant pressure at the output conduit 81 from said boiler by a throttle valve 82 in said conduit; similarly, the steam generated and superheated in the low pressure boiler is automatically maintained at a constant pressure in the output conduit 83 from said boiler by a throttle valve 84 in the conduit.

The superheated high pressure steam and the superheated low pressure steam are led to points of use; e.g., the superheated high pressure steam is led to the high pressure stage of a steam turbine and the superheated low pressure steam is led to the low pressure stage of the steam turbine, from which turbine steam is condensed and after being heated in a feed heating train passes to the feed pumps 35 and 36.

The control rods of the nuclear reactor are appropriately operated and the duty of the compressor 8 is arranged to be such that simultaneously a desired amount of power is released in the reactor and the gas coolant temperature in the conduit 10 is regulated. For example, the control rods may be operated to regulate the said gas temperature while the compressor duty is adjusted until the desired power level of reactor operation is achieved. As shown, however, it is assumed that the control rods are operated to ensure the desired power level, while the compressor 8 is arranged to be controlled in its duty automatically, as indicated by the control line 85, in dependence upon the gas coolant temperature in the conduit 10, to regulate such temperature. The valve means 53 is arranged to be controlled automatically as indicated by the control line 86, in dependence upon the gas coolant temperature in the conduit 7, to regulate such temperature.

FIGURE 6 illustrates a scheme for the operation of each of the valve members 65 by means of the corresponding control valve 78 in dependence upon said signals.

The spindle of each control valve 78 is positioned by the force derived from fluid pressure indicative of temperature in conduit 7 and applied to one side of a piston 87; by the force, which is adjustable, of a compression spring 88 opposing the fluid pressure force on said piston; by the force applied during the movement of the spindle by hydraulic damping means 89 and by the force of a compression spring 90 incorporated in a telescopic link 91 connected between one end of the spindle of the control valve 78 and an arm 92. The link 91 bears on the arm at an intermediate point of its length; at one end the arm is attached to a fixed pivot 93 and at the other end carries a fork 94 engaging a disk 95 on an extension 96 of the piston shaft 73. The arrangement is such that when the control valve spindle is moved in either direction away from its neutral position (in which hydraulic pressure is not applied thereby to move the piston of the piston and cylinder means 74) the change in the force on the arm 92 exerted by the spring 90 is in the direction opposed to the direction of movement of the arm by the shaft extension 96 arising from the application of fluid pressure to the corresponding side of the piston of the piston and cylinder arrangement 74 consequent upon the movement of the control valve spindle. It is also arranged that upon a rise or fall in temperature in the conduit 7 the valve member 65 moves in the valve closing or opening direction respectively. Thereby, the temperature in the conduit 7 will be automatically regulated.

In operation of the system indicated, the control rods in the reactor core are, as explained, appropriately adjusted to give the desired rate of power generation in the nuclear reactor, the gas coolant is circulated at a speed determined by the automatic control of the compressor to regulate the temperature in the conduit 10, the by-pass means 52 are controlled to regulate the temperature in the conduit 7, steam is generated and superheated in the high pressure and low pressure boilers, and is discharged through the automatically adjusted throttle valves 82 and 84 for use at the rate at which it is generated.

Gas coolant is by-passed in relation to heat exchange surfaces within the pressure vessel without taking by-pass ducting through the pressure vessel wall, the by-pass ducting is of light construction only, and heat losses from the gases being by-passed are minimized.

In a modification, gases are withdrawn from the gas passage 27 above the heat exchange unit 23 and by-passed in relation to all the heat exchange units 23 to 30 in the passage.

Referring to FIGURES 7 to 9, a modified form 101 of heat exchanger tower, in which heat generated in a nuclear reactor is utilized by transference from a gas coolant to a single boiler adapted for steam generating and superheating, comprises a pressure shell 102 in which one aperture 103 serves both for gas coolant entry and gas coolant exit and within which a centrifugal compressor 104 for the gas coolant is accommodated.

The pressure shell 102 consists of a cylindrical wall 105, an upper dished end 106 and a lower dished end 107. The aperture 103 is formed in the cylindrical wall 105 near the lower end thereof and through the aperture there extends horizontally a conduit 108 for the entry of heated gas coolant, which conduit 108 is joined through an elbow conduit piece 109 to the lower end of a vertical gas coolant passage 110 defined by partitioning 111. In the part of the conduit 108 within the boiler shell a shut-off valve 112 is incorporated.

The gas coolant passage 110 is spaced from the cylindrical wall 105. In the central part 113 of its vertical length it is of square-cross section and accommodates therein two heat exchange units 114 and 115 arranged in successive heat exchange relation with the gas coolant flow upwardly in the gas passage 110. In the lower part 116 of its vertical length the gas coolant passage 110 diverges upwardly from the elbow conduit piece 109 to the central part 113; every horizontal cross-section of the passage part 116 is square and one wall 117 of the four walls thereof is vertical.

Of the four walls of the passage part 113, one pair of opposite walls 121 extends upwardly uninterruptedly to the top of the space within the pressure vessel, while from the upper ends of the other pair of walls 122 extends oblique walls 123 which first converge upwardly and then are continued upwardly by vertical walls 124 which define a relatively narrow upper part 125 of the passage 110 which leads the gases to a gas turning space 125 in the uppermost part of the pressure vessel. The gas turning space 125 is bounded laterally by the uppermost parts of the opposed walls 121 and by a pair of upper walls 126 which lie in the same planes as the walls 122 and extend from the top of the pressure vessel downwardly nearly as far as the lower ends of the walls 124. Between the lower ends of the walls 126 and the upper ends of the walls 122 are gas flow outlets 127.

In the two spaces 128 between the walls 124 and the walls 126 are respective sections of a heat exchange unit 129. Gas flows downwardly from the gas turning space 125 over the sections of the heat exchange unit 129 in the spaces 128, then outwardly through the outlets 127, and then downwardly in the space 130 surrounding the central and lower parts of the gas passage 110.

The space 131 in the pressure shell at the lower end of the heat exchange tower is separated from the remainder of the space within the shell by a partition 132 in which a central aperture 133 is formed which leads to the inlet of the centrifugal compressor 104 the drive of which is from a motor (not shown) below and outside the pressure shell. The centrifugal compressor 104 discharges into the space 131 from which the gas passes through a second aperture 135 in the partition 132 into a conduit 141, in which a shut-off valve 142 is provided, to a conduit 143. The conduit 143 leads outwardly of the pressure shell through the same aperture 103 as that at which the conduit 108 enters, and is arranged concentrically of said conduit 108.

The heat exchange units 129, 114, and 115 comprise respectively the economiser, the vapour generating section and the superheater of the boiler. The heat exchange units 114 and 115 each consists of a bank of tubes extending in a plurality of loops backwards and forwards across the gas flow passage 110 and the heat exchange unit 129 consists of tubes extending in a plurality of loops backwards and forwards across the spaces 128. The necessary connections (not shown) are provided to the boiler drum 144 which, as shown, is mounted upon the upper dished end 106 of the shell. Water is arranged for generally upward flow in the heat exchange units 129 and 115.

To the vertical wall 117 there is attached on the outer side of the said wall at a circular aperture 161 therein a cylindrical box 162 into which gas can flow from the lower part 116 of the gas passage 110 under the control of a mushroom valve member 163. A pair of conduits 164 lead from the interior of the box, said conduits leading at first downwardly and parallel to the wall 117 in the space 130 and diverging from one another at equal angles to the vertical. The conduits 164 subsequently lead to the parts of the space 130 on the outer sides of the walls 165 of the gas passage lower part 116 adjacent to the wall 117 and discharge there gas passing through the aperture 161. Such gas by-passes the whole of the heat exchange surfaces in the heat exchanger tower.

The valve member 163 is adapted when the valve is closed to seat on an appropriate circular valve seat, this and other details of the valve means and of its automatic control being as described with reference to FIGURES 1 to 6.

I claim:

1. A heat generating and utilizing plant comprising a gas-cooled nuclear reactor, a heat exchanger pressure vessel, a heat transfer surface disposed within said heat exchanger pressure vessel, a conduit means connecting said pressure vessel and said nuclear reactor for the circulation of a coolant gas under super-atmospheric pressure serially through said nuclear reactor and said heat exchanger pressure vessel in heat exchange contact with said heat transfer surface and thence back to said nuclear reactor, a by-pass passage formed within said heat exchanger pressure vessel extending around at least a portion of said heat transfer surface therein, a valve operable to control coolant flow through said by-pass passage, a temperature responsive means at the reactor inlet to measure the coolant temperature at said reactor inlet, and regulating means responsive to said temperature responsive means for controlling said valve to regulate the flow of said coolant through said by-pass passage to vary the temperature of said coolant at the reactor inlet.

2. A heat generating and utilizing plant comprising a gas-cooled nuclear reactor, a heat exchanger pressure vessel, a heat transfer surface disposed within said heat exchanger pressure vessel, a conduit means connecting said pressure vessel and said nuclear reactor for the circulation of a coolant gas under super-atmospheric pressure serially through said nuclear reactor and said heat exchanger pressure vessel in heat exchange contact with said heat exchange surface and thence back to said nuclear reactor, said heat exchange surface including a boiler section and a superheater section, a by-pass passage formed within said heat exchanger pressure vessel extending around at least a portion of said boiler section, a valve operable to control coolant flow through said by-pass passage, a temperature responsive means at the reactor inlet to measure the coolant temperature at said reactor inlet, and regulating means responsive to said temperature responsive means for controlling said valve to regulate the flow of said coolant through said by-pass passage to vary the temperature of said coolant at the reactor inlet.

3. A heat generating and utilizing plant comprising a gas-cooled nuclear reactor, a heat exchanger pressure vessel, a heat transfer surface disposed within said heat exchanger pressure vessel, a conduit means connecting said presure vessel and said nuclear reactor for the circulation of a coolant gas under super-atmospheric pressure serially through said nuclear reactor and said heat exchanger pressure vessel in heat exchange contact with sand heat transfer surface and thence back to said nuclear reactor, said heat exchanger pressure vessel having a coolant inlet and a coolent outlet, said heat transfer surface including a high pressure boiler section, a low pressure boiler section and an economizer section sequentially disposed in said heat exchanger pressure vessel between said coolant inlet and said coolant outlet, a by-pass passage formed within said heat exchanger pressure vessel extending around said economizer section and at least a portion of said low pressure boiler section therein, a valve operable to control coolant flow through said by-pass passage, a temperature responsive means at the reactor inlet to measure the coolant temperature at said reactor inlet, and regulating means responsive to said temperature responsive means for controlling said valve to regulate the flow of said coolant through said by-pass passage to vary the temperature of said coolant at the reactor inlet.

4. A heat generating and utilizing plant comprising a gas-cooled nuclear reactor, a cylindrical heat exchanger pressure vessel, a heat transfer surface disposed within said heat exchanger pressure vessel, an inner casing of rectangular cross-section enclosing said heat transfer surface within said cylindrical pressure vessel forming a segmental space between said presssure vessel and said casing, a conduit means connecting said pressure vessel and said nuclear reactor for the circulation of a coolant gas under super-atmospheric pressure serially through said nuclear reactor and said heat exchanger pressure vessel in heat exchange contact with said heat transfer surface and thence back to said nuclear reactor, a by-pass passage formed within said segmental space within said heat exchanger pressure vessel extending around at least a portion of said heat transfer surface therein, a valve operable to control flow through said by-pass passage, a temperature responsive means at the reactor inlet to measure the coolant temeprature at said reactor inlet, and regulating means responsive to said temparature responsive means for controlling said valve to regulate the flow of said coolant through said by-pass passage to vary the temperature of said coolant at the reactor inlet.

5. A heat generating and utilizing plant comprising a gas-cooled nuclear reactor, a cylindrical heat exchanger pressure vessel, a heat transfer surface disposed within said heat exchanger prtssure vessel, an inner casing of rectangular cross-section enclosing said heat transfer surface within said cylindrical pressure vessel forming a segmental space between said pressure vesel and said casing, a conduit means connecting said pressure vessel and said nuclear reactor for the circulation of a coolant gas under super-atmospheric pressure serially through said nuclear reactor and said heat exchanger pressure vessel in heat exchange contact with said heat transfer surface and thence back to said nuclear reactor, said heat exchanger pressure vessel having a coolant inlet and a coolant outlet, said heat transfer surface including a high pressure boiler section, a low pressure boiler section and an economizer section sequentially disposed in said heat exchanger pressure vessel between said coolant inlet and said coolant outlet, a by-pass passage formed within said segmental space within said heat exchanger pressure vessel extending around said economizer section and at least a portion of said low pressure boiler section therein, a valve operable to control coolant flow through said by-passage, a temperature responsive means at the reactor inlet to measure the coolant temperature at said reactor inlet, and regulating means responsive to said temperature responsive means for controlling said valve to regulate the flow of said coolant through said by-pass passage to vary the temperature of said coolant at the reactor inlet.

6. A heat generating and utilizing plant comprising a gas-cooled nuclear reactor, a cylindrical heat exchanger pressure vessel, a heat transfer surface within said pressure vessel, an inner casing enclosing said heat transfer surface within said pressure vessel and having a generally rectangular cross-section forming at least one segmental space between said casing and said pressure vessel, conduit means for circulating a coolant gas under super-atmospheric pressure serially through said nuclear reactor, said heat transfer surface, said segmental space and thence back to said nuclear reactor, an opening formed in said inner casing communicating with said segmental space, a valve operable to control coolant flow through said opening, a temperature responsive means at said reactor inlet to measure the coolant temperature at said reactor inlet, and regulating means responsive to said temperature responsive means for controlling said valve to regulate the flow of said coolant through said opening to said segmental space to bypass said coolant around at least a portion of said heat transfer surface to vary the temperature of said coolant at the reactor inlet.

References Cited in the file of this patent

UNITED STATES PATENTS

| | | |
|---|---|---|
| 2,928,779 | Weills et al. | Mar. 15, 1960 |
| 2,952,602 | Wooton | Sept. 13, 1960 |

FOREIGN PATENTS

| | | |
|---|---|---|
| 797,725 | Great Britain | July 9, 1958 |

OTHER REFERENCES

Atomic Energy Commission Document ANL–5607 EBWR, pp. 1–7, 12–17 and 81–82, May 1957.

Proceedings of the International Conference on the Peaceful Uses of Atomic Energy, vol. III, held in Geneva, Aug. 8–20, 1955, United Nations, N.Y., 1956, pp. 322-329.